United States Patent [19]
Beaufays et al.

[11] Patent Number: 5,652,046
[45] Date of Patent: Jul. 29, 1997

[54] GLASS SUBSTRATE COATED WITH THIN MULTIFILMS FOR PROTECTION AGAINST SOLAR RADIATION

[75] Inventors: Jean-Pierre Beaufays, Jemeppe S/Sambre; Jean-Marc Halleux, Meux; Roland Devigne, Falisolle, all of Belgium

[73] Assignee: Saint-Gobain Vitrage International, Courbevoie, France

[21] Appl. No.: 689,499

[22] Filed: Aug. 7, 1996

Related U.S. Application Data

[63] Continuation of Ser. No. 251,285, May 31, 1994, Pat. No. 5,573,831, which is a continuation of Ser. No. 875,815, Apr. 30, 1992, abandoned.

[30] Foreign Application Priority Data

| Apr. 30, 1991 | [FR] | France | 91 05328 |
| Apr. 30, 1991 | [FR] | France | 91 05329 |
| Apr. 30, 1991 | [FR] | France | 91 05330 |

[51] Int. Cl.$^6$ .................................................. C03C 17/34
[52] U.S. Cl. .......................... 428/216; 428/336; 428/432; 428/472; 428/697; 428/699; 428/698; 428/701; 428/702; 359/360; 359/585; 359/589
[58] Field of Search ....................... 428/216, 336, 428/432, 472, 697, 699, 698, 701, 702; 359/360, 585, 589

[56] References Cited

U.S. PATENT DOCUMENTS

| 4,022,947 | 5/1977 | Grabb et al. | 428/432 |
| 4,537,798 | 8/1985 | Cohen | 427/166 |
| 4,773,717 | 9/1988 | Pat et al. | 350/3.7 |
| 5,085,926 | 2/1992 | Iida et al. | 428/216 |

FOREIGN PATENT DOCUMENTS

| 0386993 | 9/1990 | European Pat. Off. . |
| 2138026 | 10/1984 | United Kingdom . |

*Primary Examiner*—Archene Turner
*Attorney, Agent, or Firm*—Oblon, Spivak, McClelland, Maier & Neustadt, P.C.

[57] ABSTRACT

Glass composites, containing a glass substrate (1) on which is deposited an underlying film (2) based on tantalum oxide, titanium oxide or tin oxide, on which is deposited a functional film (3) based on an alloy of chromium and nickel or based on tantalum, on which is deposited an overlying film (4) based on titanium oxide, titanium nitride or tantalum oxide, provide effective protection against solar radiation while exhibiting excellent wear and corrosion resistance.

13 Claims, 1 Drawing Sheet

GLASS SUBSTRATE COATED WITH THIN MULTIFILMS FOR PROTECTION AGAINST SOLAR RADIATION

This is a Continuation, of application Ser. No. 08/251,285, filed on May 31, 1994, now U.S. Pat. No. 573,831, Continuation of application Ser. No. 07/875,815, filed on Apr. 30, 1992, abandoned.

BACKGROUND OF THE INVENTION

1. Field of the Invention

The present invention relates to glazing panes for thermal insulation and/or protection against solar radiation, and more especially a glass substrate provided with functional thin films deposited under vacuum.

2. Discussion of the Background

Substrates having multifilms are useful as glass equipment for buildings or ships. In fact, by affecting the amount of energy of the solar radiation transmitted, excessive heating inside rooms, which in especially uncomfortable in summer, may be avoided, and thus the energy consumption required for the air conditioning of said rooms may be limited. This point is especially crucial in that the present-day tendency is to increase the proportion of the glazed areas on the facades of buildings.

There exist, however, other requirements which make such substrates having films very suitable for use in buildings, a primary requirement being the durability of the thin films, especially where the glazing panes are intended for use as monolithic glazing.

It is, in fact, important for this substrate coated with thin films to be suitable for use in monolithic glazing. This application implies that the thin films shall be wear-resistant over time, even without being protected an they would be in the interior of a laminated pane or a multiple glazing pane of the double glazing type. Now in a monolithic glazing, the thin films are directly subject to attack both of a mechanical nature, for example by friction creating scratches and leading to defects in appearance in transmission as well as in reflection, and to attack of a chemical nature, for example on contact with humidity and/or pollution of the surrounding atmosphere or when the pane is cleaned with chemical products.

Nor must a requirement of an aesthetic nature be forgotten; it is desirable that the glazings when viewed in external reflections shall be able to exhibit varying tints notably rather soft and pastel shades.

It is not usually necessary to have, for building construction, panes having a very high transmission of light as may be the case for an automobile, for example for windshields, but it is nevertheless advantageous to be able to offer types of glazing having different levels of light transmission.

With regard to the method of producing the thin films, the techniques of deposition under vacuum, notably using cathodic sputtering, are well known and enable the optical performances of the films obtained to be well controlled. In particular, those techniques are known which are carried out in the presence of a magnetic field, which multiplies the impacts of the ions on the target and accelerates the deposition. Mention may be made, for example, of Pat. DE-24 63 431 C2, which presents such a method using a planar magnetron, and of the U.S. Pat. No. 4,116.806, which utilizes a target in the form of a belt, known as a "belt track".

Similarly, reactive cathodic sputtering techniques are known, which enable a thin film to be produced by causing the material of the target to react with a gas of the plasma; U.S. Pat. No. 3,907,660 thus presents such a method for the deposition of metallic oxide on glass.

Among the thin metallic or other films acting upon solar radiation, notably by reducing the energy transmission, $T_E$, both by absorption and by reflection, films based upon a chrome-nickel alloy or iron-chrome-nickel alloy are known. Thus, U.S. Pat. No. 4,022,947 presents more especially a substrate of glass provided with a film made from one of these alloys and a film of the oxide corresponding to said alloy. This oxide film is placed either on the functional film, itself deposited onto the substrate, or between the substrate and said functional film. In the former case, it has an essentially protective role, but without this protection being calculated. In the latter case, it has an essentially interferential role for the purpose of modifying the coloration on the glass side, but without the intensity thereof being indicated.

Thus, there remains a need for glass panes which are coated with thin films which can control the amount of energy transmission of solar radiation.

SUMMARY OF THE INVENTION

Accordingly, it is an object of the present invention to provide novel glass substrates having coated thereon thin multifilms, which effectively fulfil a protective function against solar radiation, are highly resistant both mechanically and chemically on the film side, and offer a range of varied colorations and purities of tint in reflection on the glass side.

It is another object to provide a method for protecting against solar radiation by installing such a glass composite in a building or ship.

These and other objects, which will become apparent during the following detailed description, have been achieved by the inventors' discovery that glass composites, comprising a glass substrate having thin multifilms comprising a functional film either of metallic alloy based on chromium and nickel or based on tantalum deposited on a film based on tantalum oxide, titanium oxide, or tin oxide and covered by a film of a metallic compound such as titanium oxide or titanium nitride or tantalum oxide offer good protection against solar radiation.

BRIEF DESCRIPTION OF THE DRAWING

A more complete appreciation of the invention and many of the attendant advantages thereof will be readily obtained as the same become better understood by reference to the following detailed description when considered in connection with the accompanying drawing, wherein.

DETAILED DESCRIPTION OF THE PREFERRED EMBODIMENTS

Figure 1:
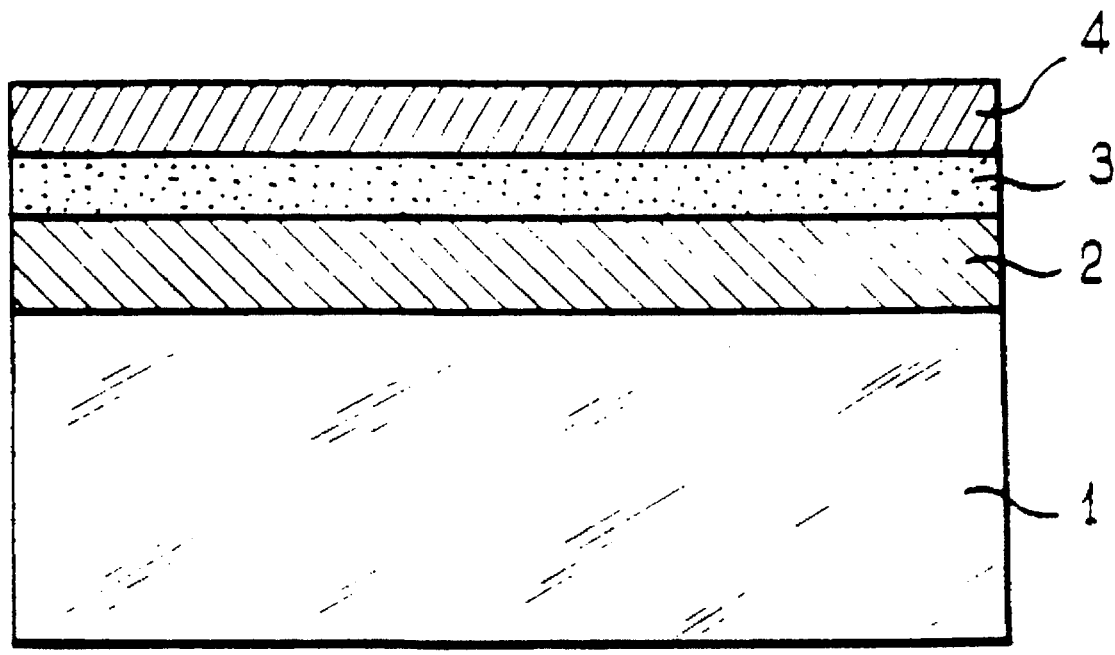
FIG. 1 is a simplified sectional view through a glass substrate having thin films according to the present invention. For reasons of clarity, the thickness ratios have not been drawn to scale.

Thus, the present glass composites comprise a glass substrate on which is coated an underlying film, on which is coated a functional film, on which is coated an overlying film. Suitable substrates include any glass which is suitable for use as a glass pane in, e.g., a building or ship. Typically, the glass pane is flat, and silico-sodo-calcic glasses are preferred. The thickness of the glass substrate is not critical but is generally from 1 to 20 mm, preferably from 2 to 10 mm.

According to the present invention, the glass composite comprises a functional film of essentially metallic alloy based upon chromium and nickel. Apart from these two metals, the alloy may contain also iron, and thus belong to the family of the stainless steels (such an steel 316 L, according to A.I.S.I. standard). Such alloys are disclosed in U.S. Pat. No. 4,022,947, which is incorporated herein by reference. Preferably, said alloy is nitrided, which gives it a greater mechanical strength. Such nitrided alloys are preferably prepared by employing an atmosphere which is completely nitrogen during the formation of the functional film. Its thickness may vary and is preferably less than 100 nm and notably between 10 and 100 nm. In fact, it is this film which gives to the final pane its solar radiation protection properties, by reducing the value of $T_E$. Another functional film according to the present invention is based upon tantalum, the thickness of which is modulated according to the desired light transmission.

It should be noted that with this type of film it is impossible to act upon the factor $T_E$ without also acting upon the light transmission factor, $T_L$, where more than 50% of the solar energy lies in the wavelength range between 0.38 and 0.78 nm, that is to say within the visible range. This leads, depending upon the thickness of the alloy film used, to proposing glazing panes having different "couples" of the value $T_L$ and $T_E$, each corresponding to a judicious compromise between a sufficient visibility in transmission and an acceptable thermal comfort, if only as a function of the latitude of the countries for which the final glazings are intended. The thicknesses generally remain, however, less than 100 nm.

With advantage, an alloy based upon nickel-chromium will be used, because it is easy to process and moderate in cost. This type of alloy is furthermore easy to use because its deposition by cathodic sputtering can be carried out at a high rate. Its characteristics are also advantageous in that it has good performances and notably an improved emissivity. The conjugate presence of nickel and chromium also leads to an appearance in reflection of the glazing on the side carrying the films which is pleasant to the eye. The ratio by mass of nickel to chromium is preferably of the order of 70/30 to 30/70, most preferably about 55/45, in the case where the alloy contains essentially nickel and chromium.

The film based upon metal and/or metallic compounds according (functional film) to this invention is placed on a metallic oxide film which will be designated hereinafter as the "underlying film" and which, itself, is deposited directly on the glass substrate. The film based upon metal and/or metallic compounds (functional film) is, furthermore, coated with another film of metallic compound, which will hereinafter be designated by the term "overlying film".

The underlying film is advantageously based upon tantalum oxide, $Ta_2O_5$, tin oxide, $SnO_2$, or titanium oxide $TiO_2$, and its thickness is from 10 to 220 nm, preferably 12 to 150 nm, most preferably 12 to 120 nm. It has a threefold function: apart from the fact that it promotes adhesion of the functional film to the substrate, its appreciable thickness gives it an interferential function for acting upon the appearance in light reflection of the glazing, but also a primary function with regard to the physico-chemical resistance of the whole stack of films. Surprisingly, in fact, the inventors of the present invention have demonstrated, as shown in the examples given below, the fact that the nature of the underlying film is not without effect in regard to the behavior under attack, notably of a chemical nature, of the stack of films.

Thus, if the underlying film is not suitably chosen, chemical corrosion may appear at the level of the underlying film, and more especially at the glass/underlying film interface, said corrosion leading to the localized destruction of the underlying film and for this reason leading to detachment of the outer layers. Now the oxides chosen for the underlying film are very advantageously especially chemically resistant both to humidity and to pollution and are therefore perfectly adapted for performing this function. Most preferably, the overlying film has a thickness of 5 to 50 nm.

The overlying film is a metallic compound, notably an oxide or nitride, and is preferably of oxide or nitride of titanium, $TiO_2$ or TiN, or of tantalum oxide $Ta_2O_5$. This overlying film has a primary protective function of a mechanical and chemical nature for the functional film which it covers. Depending upon its thickness and also that of the functional film, it may also have an interferential role and thus contribute to the appearance in reflection of the glazing. Its thickness is at maximum 100 nm, and preferably at least 5 nm. Most preferably, the overlying film has a thickness of 5 to 50 nm.

The substrate provided with these thin films is therefore suitable for use either as monolithic glazing or in association with another substrate. It may advantageously be used in building and ship construction and in the automobile industry for glazed areas that do not require very high values of $T_L$.

Referring now to the drawing, FIG. 1 shows one embodiment of the present invention. This type of film stack according to this invention notably enables the objectives of the invention to be achieved: it provides an underlying film based upon tantalum oxide (2) $Ta_2O_5$, preferably approximately 100 nm in thickness, a metallic film (3) based upon tantalum, adapted notably for achieving a final $T_L$ of approximately 11%, and an overlying film (4), also based upon $Ta_2O_5$, the thickness of which in preferably approximately 14.3 nm.

It should be stated that all these depositions of thin films are carried out one after the other on the substrate, preferably by the magnetron cathodic sputtering technique in a reactive atmosphere, but that they could be performed by any deposition technique under vacuum that enables good control of the thicknesses of the films deposited to be achieved.

The substrates 1 of silico-sodo-calcic glass, notably float glass, are introduced by a lock system into the sputtering chamber of the deposition installation. This sputtering chamber is provided with cathodes having targets of materials corresponding to the deposits to be made.

The depositions of films 2, 3, 4 are made by successive passes of the substrate beneath the metallic target and in appropriate atmospheres. For forming the underlying films 2, the target is of tantalum, titanium or tin, and the atmosphere is controlled and is composed essentially of argon and oxygen. For forming the functional films, the target is of alloy or tantalum and the deposition is performed in an atmosphere of argon and possibly also nitrogen to form a nitrided film of nickel-chromium. For forming the overlying film of oxide or of nitride (the present examples relate more especially to an oxide overlying film), a target of titanium or tantalum is used with an atmosphere of argon/oxygen (or argon/nitrogen in the case of a nitride).

In known manner, the power levels applied to each of the cathodes and also the speed of travel of the substrate are adjusted in such a way as to obtain the desired thicknesses for the films. The exact thicknesses of the functional film 3 will not, however, be indicated exhaustively in all the examples, insofar as, in a manner well known to the specialist working on installations for film deposition under vacuum; the objective is to control precisely the conditions of deposition, which vary for each type of installation, in order to achieve very precisely the desired light transmission, $T_L$, without however systematically determining very exactly the thickness of the film which enables this value of $T_L$ to be obtained.

Other features of the invention will become apparent in the course of the following descriptions of exemplary embodiments which are given for illustration of the invention and are not intended to be limiting thereof.

EXAMPLES

It Should be stated first of all that the external appearance in reflection of the substrate provided with the films according to this invention is judged by three values: the value of the external light reflection on the glass side, $R_1L$, given by the configuration of the reflection spectrum in the visible range of said substrate, taking into account the sensitivity of the eye and of a standardized light source designated by the term illuminant $D_{65}$, the value of the dominant wavelength, $\lambda_{dom}$ ($R_1L$), in nanometers indicating the colour in reflection, and the purity of excitation pe($R_1L$) indicating the "saturation" of this colour.

The value of the light reflection on the internal side, that is the side having the thin films, is hereinafter designated as $R_2L$.

Furthermore, the tests used for assessing the mechanical resistance of a stack of thin films according to this invention are now specified:

the abrasion tests enabling the mechanical resistance of the films to be evaluated are performed by means of grinding wheels made of abrasive powder embedded in an elastomer. The machine in manufactured by the company Taber Instrument Corporation of the United States. It is model number 174, "Standard Abrasion Tester", and the grinding wheels are of the type CS1OF, loaded at 500 grams. Each specimen is subjected to 300 rotations, measure the light transmission at a wavelength of 550 nm before ($\tau_0$) and after ($\tau_{300}$) abrasion. The abrasion wear is measured by the value U:

$$U\% = \tau_{300} - \tau_0$$

The standardized chemical resistance tests carried out are the following:

the tests of resistance to contact with neutral saline mist and cuproacetic saline mist complying with the standard DIN 50021. These consist, notably, of measuring the duration which elapses (in days) up to the time at which the first defect appears in the stack of thin films, when this stack is subjected to the standardized atmospheres corresponding to the two the tests.

the test SFW 2,OS for resistance to sulphur dioxide $SO_2$ complies with the standard DIN 50018. On the same principle as the two preceding tests, it determines the duration (in cycles of 8 hours exposure and followed by 16 hours rest) which elapses until the appearance of an alteration which will be specified below.

Examples 1 to 5

The first series of non-limiting examples 1 to 4 concerns a substrate having thin films possessing a reflection in the visible range on the glass side coloured blue and provided with an underlying film 2 of tantalum oxide and an overlying film 4 of titanium oxide.

The metal target used for obtaining the functional film 3 is of INCONEL 671 according to the ASTM standard.

Preferably, a sintered target is chosen here, obtained from nickel and chromium powders in the appropriate proportions. In this way, "grains" of sufficiently small diameter to obtain a uniform sputtering are obtained.

A homogeneous interdiffusion between the two powders should, moreover, be achieved in order to produce a non-magnetic target.

The substrate 1 is clear float silico-sodo-calcic glass, 6 mm in thickness.

The thickness of the film 3 in each of the examples is chosen in order to obtain the desired light transmission value, $T_L$. In the present case, as in the following examples 6 and 7, it lies between 10 and 100 nm.

The thicknesses in nanometers of the underlying film 2 of $Ta_2O_5$, of the functional film 3, of the overlying film 4 of $TiO_2$, and also the light transmission, $T_L$, of the assembly comprising substrate/multifilms are indicated below:

| EXAMPLE | (2) $Ta_2O_5$* | (3) $NiCrN_x$* | (4) $TiO_2$ | $T_L$ |
|---|---|---|---|---|
| 1 | 100 | 15 | 10 | 35% |
| 2 | 100 | 28 | 10 | 19% |
| 3 | 100 | 36 | 10 | 14% |
| 4 | 100 | 45 | 10 | 8% |

*nm.

It is found that, by varying the thickness of the functional film 3 within the bracket of values previously indicated, it is possible to obtain a wide range of light transmission, $T_L$. It should be stated, however, that these thickness values for obtaining a given value of $T_L$ are, in these examples, largely subject to the conditions of deposition, and notably to the nitridation level of the alloy deposited.

In order to demonstrate the good performances when subjected to mechanical and chemical corrosions of the substrates coated according to this invention, a comparison has been made between these four examples, and more especially example 2, and an example 5, composed of a similar stack of three films: metallic oxide/nitrided metallic alloy/metallic oxide, on the same substrate, the characteristics of which are as follows:

| | |
|---|---|
| underlying film (2) | mixture of zinc oxide and tin oxide, 84 nm thick |
| film (3) | stainless steel 316 to A.I.S.I. standard, 22 nm thick |
| overlying film (4) | titanium oxide, 10 nm thick. |

The photometric characteristics of examples 2 and 5 are close, it being understood that the last column of the following table indicates the color in reflection on the substrate side:

| EX. | $T_L$ | $R_1L$ | $R_2L$ | $T_B$ | $\lambda_{dom}$ ($R_1L$)* | pe ($R_1L$) | color $R_1L$ |
|---|---|---|---|---|---|---|---|
| 2 | 19% | 18% | 34% | 20% | 482 | 24% | blue |
| 5 | 20% | 17% | 43% | 17% | 480 | 22% | blue |

*nm.

In both cases, a pastel blue color is obtained in $R_1L$. In contrast, the value of $R_2L$ of example 2 is less than that of example 5: thus the composite according to example 2, installed as a monolithic glazing in a room, has a reflection moderated on the side of the thin films (that is to say inside said room if they are on face 2, which enables the "mirror" effect to be limited to the case of weak exterior light and high interior luminosity).

In contrast, the corrosion tests on the two coated monolithic substrates give very different results: (these tests represent the period up to the appearance of an alteration in the stack of films which corresponds to a modification of $T_L$ of 10%).

| EX. | abrasion | saline mist* | cupro-acetic mist* | sulphur dioxide* |
|---|---|---|---|---|
| 2 | 1.8 | >62 | >50 | >37 |
| 5 | 3.7 | 21 | 1 | >1 |

*Time in days until a change of 10% in $T_L$.

The weakness of the results in the chemical tests of example 5 appear to exclude its use as a monolithic glazing in extreme conditions of humidity and/or pollution.

In contrast, the film stack of example 2 according to the present invention offers excellent chemical resistance, which demonstrates the surprising synergistic effect of an underlying film of $Ta_2O_5$, a nitrided functional film and an overlying film of $TiO_2$, which enables a substrate having this type of film stack on face 2 to be used as monolithic glazing, whatever the conditions of use and/or climatic conditions to which said glazing in normally subjected.

Examples 6 and 7

This second series of examples relates to a substrate, the three thin films of which are of exactly the same nature an in the preceding examples 1 to 4, but it exhibits in reflection, $R_1L$, a bronze coloration for a value of $T_L$ of approximately 20%.

The thicknesses of the thin films 2 and 4 according to this invention are as shown below:

| EX. | (2) $Ta_2O_5$* | (4) $TiO_2$* | $T_L$ | $T_E$ | color ($R_1L$) |
|---|---|---|---|---|---|
| 6 | 37.5 | 10 | 19% | 20% | strong bronze |
| 7 | 12.5 | 10 | 19% | 20% | light bronze |

*nm.

Example 8

This time, the substrate is provided with an underlying film 2 of $Ta_2O_5$, functional film 3 of Ta and an overlying film 4 again Of $Ta_2O_5$:

| (2) $Ta_2O_5$ | underlying film of thickness 100 nm |
|---|---|
| (3) Ta | functional film for solar protection, of thicknesses adapted for obtaining a $T_L$ of approximately 11% |
| (4) $Ta_2O_5$ | overlying film of thickness 14.3 nm. |

The photometric characteristics of a film stack of this type are as follows:

| EX. | $T_L$ | $R_1L$ | $R_2L$ | $T_E$ | $\lambda_{dom}$ ($R_1L$)* | pe ($R_1L$) | color $R_1L$ |
|---|---|---|---|---|---|---|---|
| 8 | 11.2% | 9.4% | 37% | 14.5% | 480 | 14.6% | blue |

*nm.

Examples 9 to 12

The following series of examples concerns a substrate having thin films possessing a reflection in the visible range on the glass side colored bronze, with an overlying film 4 based upon titanium oxide and an underlying film 2 also based upon titanium oxide $TiO_2$.

The metal target used for obtaining the functional film 3 is of INCONEL 671 for example 9, that is to say essentially based upon Ni—Cr according to the ASTM standard, produced exactly as described in the preceding examples 1 to 7.

In example 10, the film (3) also contains iron and the target is of nitrided steal SST 316 to A.I.S.I. standard.

The substrate 1 is of clear float silico-sodo-calcic glass, 6 mm in thickness.

The thickness of film 3 is adapted in each case in order to obtain the desired light transmission value, $T_L$. In the present case, it lies between 10 and 100 nm.

The thicknesses in nanometers of the underlying film 2 of $TiO_2$, of the functional film 3, of the overlying film 4 of $TiO_2$, and also the light transmission, $T_L$, of the assembly comprising substrate/multifilms, are indicated below:

| EXAMPLE | (2) $TiO_2$* | (3) functional film* | (4) $TiO_2$* | $T_L$ |
|---|---|---|---|---|
| 9 | 15 | 28 | 10 | 21% |
| 10 | 15 | 28 | 10 | 21% |

*nm.

In order to demonstrate the good performances of the substrates coated according to the present invention when subjected to mechanical and chemical corrosion, a comparison was made between these two examples, and more especially examples 9 and 10, and an example 11, composed of a similar stack of 3 films: metallic oxide/nitrided metallic alloy/metallic oxide, on the same substrate, the characteristics of which are as follows:

| underlying film (2) | mixture of zinc and tin oxides, 10 nm in thickness |
|---|---|
| film (3) | stainless steel 316 to A.I.S.I. standard, 20 nm thick |
| overlying film (4) | titanium oxide, 10 nm thick. |

The photometric characteristics of examples 9 and 10 on the one hand and 11 on the other hand are very close, it being understood that the last column of the table below indicates the color in reflection of the substrate side:

| EX. | $T_L$ | $R_1L$ | $R_2L$ | $T_E$ | $\lambda_{dom}$ ($R_1L$)* | pe (R,L) | color $R_1L$ |
|---|---|---|---|---|---|---|---|
| 9 | 21% | 26% | 32% | 18% | 493 | 2.1% | light bronze |
| 10 | 21% | 25% | 30% | 17% | 504 | 0.8% | light bronze |
| 11 | 20% | 25% | 35% | 17% | 490 | 2.1% | light bronze |

*nm

In these three cases, a color in a very pastel bronze tonality is obtained in $R_1L$.

The corrosion tests on the three coated monolithic substrates give, however, very different results; (these tests denote the period up to the appearance of an alteration in the film attack corresponding to the appearance of a first visible defect).

| EX. | abrasion | saline mist* | cupro-acetic mist* | sulphur dioxide* |
|---|---|---|---|---|
| 9 | 2.5 | >78 | >90 | >20 |
| 10 | 1.5 | >78 | >90 | 5 |
| 11 | 2.1 | 14 | 1 | 1 |

*time in days until first visible defect appears.

The weakness of the results of the chemical tests of example 11 appear to exclude its use as a monolithic glazing in extreme conditions of humidity and/or pollution.

In contrast, the film stacks of examples 9 and 10, and more especially of example 9 according to this invention, show excellent chemical resistance, which demonstrates the surprising synergistic effect of an underlying film of $TiO_2$ and of a metal film based upon nitrided nickel and chromium and of an overlying film of $TiO_2$; which once again enables the substrate with this type of film stack to be used as a monolithic glazing, whatever the conditions of use and/or climatic conditions to which said glazing in normally subjected.

In these examples, a small thickness for the underlying film 2 of $TiO_2$ has been chosen, which enables a glazing to be produced, the bronze color of which in reflection, $R_1L$, is judged fairly favorably in building. It is, however, clear that by varying this thickness; and notably by increasing it substantially, an interferential effect can be obtained enabling this tonality to be modified. This then makes it possible to offer glazings having different values of $T_L$ and, for each of these values, different colors in reflection, $R_1L$, a selection of thicknesses which can certainly be readily carried out in all the examples according to this invention.

Examples 12 to 15

The series of non-limiting examples 12 to 15 concerns a substrate having thin films possessing a reflection in the visible range on the glass side which are colored blue, with an underlying film 2 of $SnO_2$ and an overlying film 4 of $TiO_2$.

The metallic target used for producing the functional film 3 is of INCONEL 671 according to the ASTM standard as before.

The substrate 1 is of clear float silico-sodo-calcic glass of 6 mm thickness.

The thickness of the film 3 is adapted in each of the examples in order to obtain the desired value of $T_L$. In the present case, as in the following examples 16 and 17, it lies between 10 and 100 nm.

The thicknesses in nanometers of the underlying film 2 of $SnO_2$, of the functional film 3, of the overlying film 4 of $TiO_2$, and also the light transmission, $T_L$, of the assembly comprising substrate/multifilms, are given below:

| EXAMPLE | (2) $SnO_2$* | (3) $NiCrN_x$* | (4) $TiO2$* | $T_L$ |
|---|---|---|---|---|
| 12 | 85 ± 5 | 15 | 10 | 35% |
| 13 | 85 ± 5 | 28 | 10 | 19% |
| 14 | 85 ± 5 | 36 | 10 | 14% |
| 15 | 85 ± 5 | 45 | 10 | 8% |

*nm

In order to demonstrate the good performances of the substrates coated according to this invention, when subjected to mechanical and chemical corrosions, a comparison was made between these four examples, and more especially example 13, and example 5.

The photometric characteristics of examples 13 and 5 are close, it being understood that the last column of the table below indicates the color in reflection of the substrate side:

| EX. | $T_L$ | $R_1L$ | $R2L$ | $T_B$ | $\lambda_{dom}$ ($R_1L$)* | pe ($R_2L$) | color $R_2L$ |
|---|---|---|---|---|---|---|---|
| 13 | 19.5% | 17.7% | 38.6% | 18% | 481 | 25.9% | blue |
| 5 | 20% | 17% | 43% | 17% | 480 | 22 | blue |

*nm.

In these two cases, a pastel blue colour is obtained in $R_1L$. In contrast, the value of $R_2L$ of example 13 is less than that of example 5.

In contrast, the corrosion tests on the two coated monolithic substrates give vary different results: (these tests count the period, up to the appearance of an alteration in the film stack which leads to a first visible defect).

| EX. | abrasion | saline mist* | cupro-acetic mist* | sulphur dioxide* |
|---|---|---|---|---|
| 13 | 1.0 | >60 | >60 | >5 |
| 5 | 3.7 | 7 | 1 | <1 |

*Time in days until first visible defect appears.

The weakness of the results in the chemical tests of example 5 is clear.

In contrast, the film stack of example 13 according to this invention exhibits excellent chemical resistance, which demonstrates the surprising synergistic effect of a resistant underlying film of $SnO_2$, of a nitrided functional film and of an overlying film of $TiO_2$, which enables a substrate with this type of multifilm stack to be used as a monolithic glazing pane in face 2, whatever the conditions of use and/or climatic conditions to which said glazing is normally subjected.

Examples 16 and 17

This series of examples concerns a substrate, the three thin films of which are of exactly the same kind as in the preceding examples 12 to 15, but they have in reflection, $R_1L$, a bronze coloration with a value of $T_L$ Of approximately 20%.

The thicknesses of the thin films 2 and 4 according to this invention are as follows:

| EX. | (2) $SnO_2$* | (4) $TiO_2$* | $T_L$ | $T_B$ | colour ($R_1L$) |
|---|---|---|---|---|---|
| 16 | 30 | 10 | 19% | 20% | strong bronze |
| 17 | 10 | 10 | 19% | 20% | light bronze |

*nm

In conclusion, all the examples of the present application which are in conformity with the present invention relate to glazings which exhibit excellent corrosion resistance, Furthermore, it in possible to obtain glazings having a large range of spectrophotometric properties.

Thus, by varying the thickness of the functional film, it is possible to choose the desired light transmission. Furthermore, by modifying only the thickness of the underlying film, the range of pastel colors in reflection, $R_1L$, can be varied, while maintaining an almost constant value of $T_L$.

It is self-evident, therefore, that by modifying both the thickness of the underlying film and the thickness of the functional film, it is possible to obtain thin-film substrates of different colors in reflection, $R_1L$, and, for each of these colors, different light transmissions, $T_L$, and energy transmissions, $T_E$.

It is also possible to choose a thickness of overlying film of greater or lesser value, in order to classify it as having a protective function, or to give it an interferential function.

It should also be noted that by choosing proper thicknesses for the films, it is possible also to modulate the reflection, $R_2L$.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A glass composite, comprising:
   (1) a glass substrate;
   (2) an underlying film of titanium oxide, tin oxide or tantalum oxide;
   (3) a functional film of tantalum or an alloy of chromium and nickel; and
   (4) an overlying film of titanium oxide or tantalum oxide; wherein
   said underlying film (2) is deposited on said glass substrate (1), said functional film (3) is deposited on said underlying film (2), and said overlying film (4) is deposited on functional film (3), said films (2), (3), and (4) forming a stack on said glass substrate (1).

2. The glass composite is claim 1, wherein said functional film (3) is based on chromium and nickel and is nitrided.

3. The glass composite of claim 1, wherein said functional film (3) is based upon nickel-chromium in a relative proportion of Ni to Cr by mass of about 55/45.

4. The glass composite claim 1, wherein said functional film (3) contains also iron, and is a stainless steel.

5. The glass composite of claim 1, wherein said functional film (3) has a thickness of less than 100 nm.

6. The glass composite of claim 1, wherein said underlying film (2) has a thickness of from 10 to 220 nm.

7. The glass composite of claim 1, wherein said film overlying (4) has a thickness of from 5 to 100 nm.

8. The glass composite of claim 1, wherein said substrate (1) is clear float glass with a thickness of about 6 mm, said underlying film (2) is tantalum oxide with a thickness of about 100 nm, said functional film (3) is nitrided NiCr with a relative proportion of Ni to Cr by mass of about 55/45, and said overlying film (4) is titanium oxide having a thickness of about 10 nm, and the thickness of said functional film (3) based upon nitrided NiCr is adjusted in order that the composite has a light transmission, $T_L$, of approximately 19%.

9. The glass composite of claim 1, wherein said functional film (3) is based on tantalum, said underlying film (2) is based upon tantalum oxide, and said overlying film (4) also based upon tantalum oxide.

10. The glass composite of claim 9, wherein said underlying film (2) has a thickness of approximately 100 nm, and said overlying film (4) has a thickness of approximately 14.3 nm, and said functional film (3) has a thickness adjusted in order that the composite has a light transmission, $T_L$, of approximately 11%.

11. The glass composite of claim 1, wherein said substrate (1) is clear float glass of about 6 mm thickness, said underlying film (2) is $TiO_2$ of approximately 15 nm in thickness, said functional film (3) is nitrided nickel-chromium with a relative proportion of Ni to Cr by mass of about 55/45, said overlying film (4) is titanium oxide of approximately 10 nm in thickness, and the thickness of said functional film (3) of nitrided NiCr is adjusted in order that the composite has a light transmission of approximately 21%.

12. The glass composite of claim 1, wherein said substrate (1) is clear float glass of about 6 mm thickness, said underlying film (2) is tin oxide of approximately 85 nm in thickness, said functional film (3) is nitrided NiCr in a relative proportion of Ni to Cr by mass of about 55/45, said overlying film (4) is titanium oxide of approximately 10 nm in thickness, and the thickness of said functional film (3) of nitrided NiCr is adjusted in order that the composite has a light transmission, $T_L$, of approximately 19%.

13. The glass composite of claim 1, wherein said films that are not purely metallic are produced by reactive cathodic sputtering under vacuum assisted by a magnetic field, the metallic oxides in the presence of oxygen, and the nitrided functional films and/or functional films of nitrides in the presence of nitrogen.

* * * * *

UNITED STATES PATENT AND TRADEMARK OFFICE
CERTIFICATE OF CORRECTION

PATENT NO. : 5,652,046
DATED : July 29, 1997
INVENTOR(S) : Jean-Pierre BEAUFAYS, et al.

It is certified that error appears in the above-identified patent and that said Letters Patent is hereby corrected as shown below:

On the title page, item [63], and at the top of column 1, the Patent Number for Related U.S. Application Data should be:

--5,573,839--

Signed and Sealed this

Thirtieth Day of December, 1997

Attest:

*Attesting Officer*

BRUCE LEHMAN

*Commissioner of Patents and Trademarks*